Dec. 10, 1968  PER-OLAF WEMAN  3,415,536
MEANS FOR FASTENING A SAFETY BELT ON THE FLOOR OF A VEHICLE
Filed Dec. 9 1966

Inventor:
PER-OLAF WEMAN
By Lowry & Rinehart
ATTYS.

United States Patent Office 3,415,536
Patented Dec. 10, 1968

3,415,536
MEANS FOR FASTENING A SAFETY BELT ON THE FLOOR OF A VEHICLE
Per-Olaf Weman, Hamburg-Garstedt, Germany, assignor to Sigmatex A.G., Basel, Switzerland, a firm
Filed Dec. 9, 1966, Ser. No. 600,482
Claims priority, application Germany, Jan. 11, 1966, S 101,373
10 Claims. (Cl. 280—150)

ABSTRACT OF THE DISCLOSURE

This provides a safety belt assembly for a vehicle. The assembly comprises a fastening means fixedly attached to the vehicle floor and at least one end of a safety belt anchored to the said fastening means. A bow means is pivotally mounted on the fastening means to press a portion of the safety belt against the vehicle floor when the belt is not in use.

BACKGROUND OF THE INVENTION

In the arrangement of safety belts in motor vehicles it has proved to be a drawback of the known constructions that portions of the safety belt lie about in loose coils on the floor of the vehicle when the belt is not in use so that passengers of the vehicle may get caught with their feet in such coils and tumble over when getting in or out of the vehicle. This is, no doubt, avoided to a certain extent by providing self-retracting belt winders which are fixed to a door-post or the floor of the vehicle. Such belt winders are, however, relatively expensive and in the case of three-point safety belts at least two of them must be provided when it is to be ensured that no belt portions are lying about on the floor of the vehicle when the belt is not in use.

SUMMARY OF THE INVENTION

It is the object of the present invention to further develop a means for fastening on the floor of a vehicle a safety belt, particularly a three-point safety belt, at least one end of which is fixed to the fastening means on the floor of the vehicle, the development being such that curling of the belt on the floor of the vehicle in the region of the doors is avoided.

According to another object of the invention the fastening means is to be of simple construction and consequently inexpensive to manufacture. Moreover, the construction should be such that the fastening means can be subsequently attached to replace already existing fastening means without this involving major costs. This object is attained according to the invention in that the fastening means is provided with a pivotally mounted bow which presses that portion of the safety belt which is adjacent the fastening means against the floor of the vehicle when the safety belt is not in use. By means of such a fastening means on the floor of a vehicle that portion of a safety belt which was hitherto subjected to curling is held in stretched condition on the floor of the vehicle so that the danger of a passenger getting caught with a foot and tumbling over is considerably reduced. According to the invention this effect is still enhanced in that the bow is under the tension of at least one spring, thereby holding portions of the safety belt in position on the floor by means of spring tension when the belt is not in use.

According to an important feature of the invention the bow is arranged inside the vehicle along the longitudinal side thereof. This type of arrangement is advantageous in the case of a three-point safety belt, one end of which is fixed to an inner wall of the vehicle and another end of which can be anchored between the seats of the vehicle when taking the belt into use, whereas it can be suspended in another place of the wall of the vehicle when not in use, since in this arrangement it is definitely avoided that loose belt portions are lying about inside the vehicle.

According to an expedient embodiment of the invention the bow extends approximately from the back side of a front seat to the front side of a back seat of the vehicle so that in the case of two-door vehicles the entry opening is clear of the belt.

In the above description of a pivotable bow the term bow is to be understood in the broadest possible sense. This bow according to the invention may therefore also be constituted by a spring-loaded covering around a portion of a safety belt, said covering being pivotable about the fastening means on the floor of the vehicle and being preferably made of synthetic plastic material which can be more easily washed than the rest of the belt portion so that it can be easily cleaned after stepping thereon unintentionally.

BRIEF DESCRIPTION OF DRAWINGS

One expedient embodiment of the invention will now be described by way of example and with reference to the accompanying drawing, in which.

DESCRIPTION OF SPECIFIC EMBODIMENT

Figure 1:
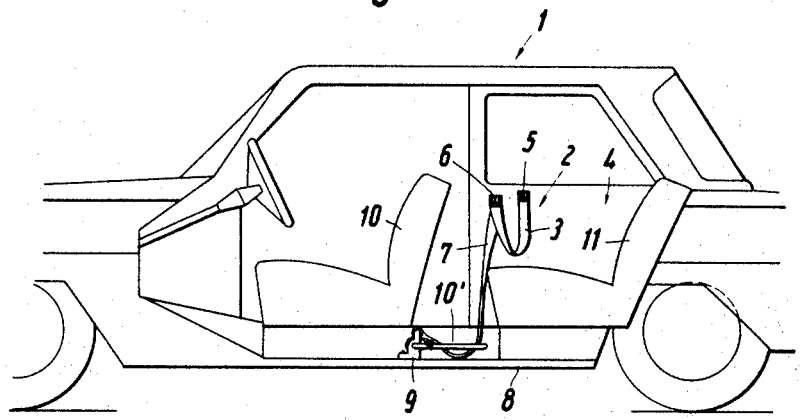
FIG. 1 is a schematic side elevational view of a two-door motor vehicle with a three-point safety belt.

FIG. 1 shows a vehicle 1 which is provided with a three-point safety belt 2 including a shoulder belt 3 which is fastened at its upper end to a wall 4 of the vehicle 1 by means of fixing means 5. The shoulder belt 3 is passed through a loop of a belt buckle 6 which is loosely suspended from the wall 4 of the vehicle. A hip belt portion 7 extends from the belt buckle 6 to a fastening means 9 arranged on the floor 8 of the vehicle. For taking the three-point safety belt 2 into use, the belt buckle 6 is detached from the wall 4 of the vehicle and connected with another part of a buckle (not shown in the drawing) in such a manner that the shoulder belt 3 extends diagonally over the shoulder of a passenger sitting on a front seat 10, whereas the hip belt 7 extends substantially transversely of the body of the passenger.

In order to avoid curling of the belt on the floor 8 of the vehicle between the front seat 10 and back seats 11, thereby eliminating the danger of back seat passengers getting caught with their feet when getting in or out of the vehicle 1, the fastening means 9 arranged on the floor 8 of the vehicle is provided with a pivotable bow 10' which keeps the lower portion of the hip belt 7 stretched out on the floor 8 of the vehicles. This bow 10' extends approximately from the back side of the front seat 10 to the front side of the back seat 11.

Figure 2:
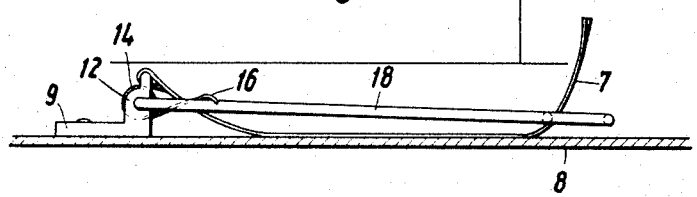
FIG. 2 is a side elevational view, on an enlarged scale, of a means for fastening the safety belt on the floor of a vehicle according to FIG. 1, said fastening means having a pivotable bow.
Figure 3:
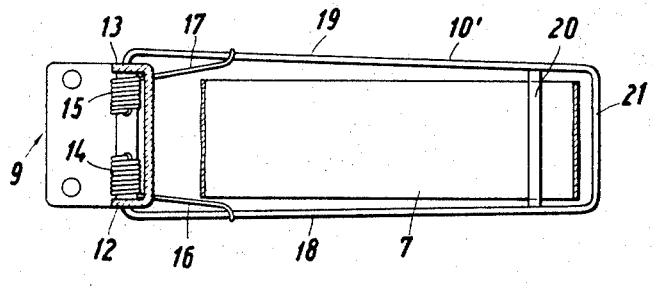
FIG. 3 is a top plan view of the arrangement of FIG. 2.

As is clearly shown in FIGS. 2 and 3, the bow 10' is of substantially U-shaped configuration. Both its free ends are pivotally mounted in side walls 12 and 13 of the fastening means 9. Between these side walls 12 and 13 two helical springs 14 and 15 are held in the fastening means 9, the free ends 16 and 17 of said springs resting on the two legs 18 and 19 of the U-shaped bow 10' in such a manner that they press the latter against the floor 8 of the vehicle.

On its side remote from the fastening means 9 the bow 10' is provided with two parallel connecting webs 20 and 21 through which the hip belt portion 7 is passed for being held in position.

When the safety belt 2 is taken into use, which is usually the case after all the passengers have taken their seats in the vehicle, the bow 10' is pivoted in counterclockwise direction about the fastening means 9 on the floor of the vehicle against the action of the spring 14 and 15 so that it constantly exerts a slight pull on the hip belt 7 when the belt is put on.

It is to be noted that in the arrangement shown in FIG. 1 the bow 10' with the fastening means 9 is arranged on that portion of the floor 8 which is near the longitudinal side of the vehicle so that the safety belt 2 with all its belt portions lies against the wall 4 of the vehicle when it is not being used and does not impair the freedom of movement of the passengers when getting in or out.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:

1. A safety belt assembly for a vehicle having a floor comprising:
    (a) fastening means fixedly attached to the vehicle floor,
    (b) at least one end of a safety belt anchored to said fastening means, and
    (c) a bow means pivotally mounted on said fastening means to press a portion of the safety belt against the vehicle floor when the belt is not in use.

2. A safety belt assembly as defined in claim 1 further including
    at least one spring means mounted on said fastening means to exert pressure on said bow means to move the bow means in a direction toward the floor of said vehicle.

3. A safety belt assembly as defined in claim 2 wherein said fastening means is located along the longitudinal side of the vehicle.

4. A safety belt assembly as defined in claim 3 wherein said bow means extends from about the back side of a front seat to about the front side of a back seat of the vehicle.

5. A safety belt assembly as defined in claim 4 wherein the end opposite the anchored end of the safety belt is fastened to a wall of the vehicle behind the front seat thereof,
    said belt includes a buckle located at a point intermediate the two ends of the belt to form a hip belt portion and a shoulder belt portion, and
    said bow means exerts pressure against said hip belt portion.

6. A safety belt assembly as defined in claim 4 wherein said bow means comprises a U-shaped structure having two free ends,
    said free ends are movably mounted on said fastening means.

7. A safety belt assembly as defined in claim 6 wherein said spring means include helical springs mounted on said fastening means,
    said helical springs having free ends being in contact with said U-shaped bow to press said bow against a portion of the belt in a direction toward the vehicle floor.

8. A safety belt assembly as defined in claim 7 wherein the end opposite the anchored end of the safety belt is fastened to a wall of the vehicle behind the front seat thereof,
    said belt includes a buckle located at a point intermediate the two ends of the belt to form a hip belt portion and a shoulder belt portion, and
    said bow means exerts pressure against said hip belt portion.

9. A safety belt assembly as defined in claim 4 wherein said bow means comprises a belt covering around a portion of said safety belt,
    said covering having one end pivotally mounted on said fastening means.

10. A safety belt assembly as defined in claim 9 wherein said covering is composed of a synthetic plastic material.

References Cited

UNITED STATES PATENTS

| 2,947,353 | 8/1960  | Van Wimmerspreg | 280—150 |
| 2,963,080 | 12/1960 | Zang            | 297—388 |
| 3,185,246 | 6/1965  | Mauer           | 280—150 |
| 3,322,462 | 5/1967  | Boedigheimer    | 297—388 |

BENJAMIN HERSH, *Primary Examiner.*

J. E. SIEGEL, *Assistant Examiner.*

U.S. Cl. X.R.

297—385